(12) United States Patent
Fuchs et al.

(10) Patent No.: US 6,827,535 B2
(45) Date of Patent: Dec. 7, 2004

(54) DOWEL BOLT WITH EXPANSION CONTROL

(75) Inventors: Helmut Fuchs, Muchamiel-Alicante (ES); Thomas Doppelbauer, Feldkirch (AT); Herbert Kaufmann, Wolfurt (AT); Hubert Forster, Moorenweis (DE); Frank Anschütz, Schaan (LI)

(73) Assignee: Hilti Aktiengesellschaft, Schaan (LI)

( * ) Notice: Subject to any disclaimer, the term of this patent is extended or adjusted under 35 U.S.C. 154(b) by 21 days.

(21) Appl. No.: 10/300,984

(22) Filed: Nov. 21, 2002

(65) Prior Publication Data

US 2003/0123948 A1 Jul. 3, 2003

(30) Foreign Application Priority Data

Nov. 23, 2001 (DE) .......................... 101 57 586

(51) Int. Cl.⁷ ................................. F16B 13/06
(52) U.S. Cl. ...................... 411/44; 411/9; 411/473
(58) Field of Search ................ 411/44, 60.1, 60.2, 411/481, 473, 926, 439, 8, 9, 13, 14

(56) References Cited

U.S. PATENT DOCUMENTS 3,091,991 A * 6/1963 Baker ........................ 411/54
3,329,057 A * 7/1967 Salz ......................... 411/366.1
3,481,243 A * 12/1969 Gatz .......................... 411/404
4,339,217 A * 7/1982 Lacey ........................ 411/55
4,968,200 A * 11/1990 Mark .......................... 411/55
6,062,788 A * 5/2000 Ying-Feng ................. 411/480

FOREIGN PATENT DOCUMENTS

| DE | 1289366 | 2/1969 |
| DE | 9602513 | 5/1996 |
| DE | 0104308 | 9/2001 |

* cited by examiner

*Primary Examiner*—Flemming Saether
(74) *Attorney, Agent, or Firm*—Sidley Austin Brown & Wood, LLP

(57) ABSTRACT

A dowel bolt is formed of a bolt (1) and has at the trailing end an outer thread (2) and on the leading end an expansion head (3) expanding in the setting direction (S) and an expansion sleeve (4) that can be expanded by the expansion head (3). At the trailing end face (15) directed away from the setting direction of the bolt, the bolt has at least one peripheral recess (16) with a depth (t1) providing a setting control and that can be economically manufactured.

6 Claims, 1 Drawing Sheet

DOWEL BOLT WITH EXPANSION CONTROL

BACKGROUND OF THE INVENTION

The invention relates to a dowel bolt comprised of a bolt having a leading end in the setting direction and an opposite, trailing end with an outer thread at the trailing end, and an expansion head and an expansion sleeve in the leading end region that is expanded by the expansion head.

Dowel bolts of the type described above are used in fastening objects to a structural component. A bore hole is created in the structural component, whose diameter corresponds approximately to that of the outer diameter of the bolt or is even somewhat less with respect to the bolt. The dowel bolt is set in the bore hole by one or several strokes with a hammer, for example. Due to the relative movement of the bolt, particularly that of the conical part of the expansion head to the expansion sleeve, it friction-lockingly rests on the inner wall of the bore hole and expands radially so as to anchor the dowel bolt in the structural component, and in particular in the bore hole.

DE 296 02 513-U1 discloses a dowel bolt comprised of a bolt having at one end an outer thread and on the opposite end a cone and an expansion sleeve, which expands in the setting direction.

In particular, when using a worn drill bit for creating a bore hole, the dowel bolt can be inserted into the bore hole only by applying considerable force, for example, by hammer impact. This has the drawback that the bore hole and/or the dowel bolt can be damaged and consequently the required loads can no longer be accommodated or the required setting depth and thus the load level is not assured.

SUMMARY OF THE INVENTION

The object of this invention is to provide a dowel bolt that can be economically manufactured and, by virtue of its visual appearance in the set condition, provides feedback relative to the quality of its anchorage.

The object is achieved according to the invention in that the bolt has, on its trailing end facing away from the setting direction, at least one peripheral recess with a indentation.

By virtue of the fact that at least one recess is arranged on the trailing end face of the bolt facing away from the setting direction, a plastic change occurs on the trailing end face when inserting the bolt. Depending on the magnitude and number of impact blows acting upon the trailing end face in particular hammer blows, the indentation itself changes as does the area of the end face abutting the indentation. The deformations in the set condition allow, on the basis of their appearance, conclusions to be made regarding the quality of the anchorage and in this fashion act as setting controls. Because of the arrangement of the recess in the peripheral zone of the trailing end face of the bolt opposite the setting direction, the deformations occur when inserting the dowel bolt into the bore hole. Moreover, it is also possible, for example, by virtue of the peripheral arrangement of the recess to make conclusions regarding the direction of the impacts. Ideally, impact is applied in the axial direction of the bolt; this creates a uniform deformation in the recess. If the impact acts at an angle to the axis of the bolt it will also be evident in the deformation of the recess. A further advantage offered by the recess is in the accommodation of material, compacted by the impact, of the trailing end face of the bolt. This prevents an excessive deformation of the external circumference of the bolt in the area of the trailing end face and assures that a load bearing means, a nut for example, can easily be attached to the trailing end face of the bolt.

The recess is advantageously configured open towards the external periphery of the bolt to assure deformation of the trailing end face of the bolt. In other words, the recess is open on the trailing end face and on the circumferential periphery of the bolt adjacent the trailing end face. Further, the recess being open to the outer periphery of the bolt prevents an excessive expansion of the outer periphery of the bolt due to the compacted material occurring when inserting the bolt. In addition, a further embodiment of the recess in the zone of the outer periphery has a web with a minimal wall thickness in order to provide a closed outer periphery.

The radially outer part of the recess advantageously exhibits an approximately triangular cross-section to allow inexpensive manufacture of the dowel bolt.

Advantageously, the recess forms on the trailing end face of the bolt opposite to the setting direction and radially inwardly of the triangular cross-section, a rectangular opening which allows inexpensive manufacture of the dowel bolt. In a further embodiment, the recess on the trailing end face of the bolt facing away from the setting direction exhibits a trapezoidal-shaped opening.

In order to assure optimal deformation of the trailing end face by the action of the impacts at the time of insertion of the bolt, for example, preferably two corresponding recesses are arranged diametrically opposite to each other.

The recess advantageously has at least one spacing or separation a from the central axis of the bolt, the separation corresponding to 0.15 to 0.35 times the diameter of the bolt, to assure optimal load bearing by the bolt.

The depth of the recess preferably corresponds to 0.03 to 0.08 times the diameter of the bolt so as to enable economical manufacture of the bolt. In addition, this assures that on the one hand there is no occurrence of impairment of the loading of the dowel bolt and on the other hand the recesses are easily recognized for example by the user or by a setting control machine.

In order to optimally dimension the deformation of the recess at the time of setting the bolt, the maximum width of the depth of the recess extending in the circumferential direction of the bolt corresponds to 0.05 to 0.2 times the diameter of the bolt.

Advantageously, four recesses are uniformly spaced around the periphery of the bolt so as to assure easily recognizable deformation irrespective of the direction of the impact acting on the face end of the bolt opposite to the setting direction in the setting process.

BRIEF DESCRIPTION OF THE DRAWING

The invention is more completely described in the following using an exemplary embodiment, wherein.

DETAILED DESCRIPTION OF THE INVENTION

Figure 1:
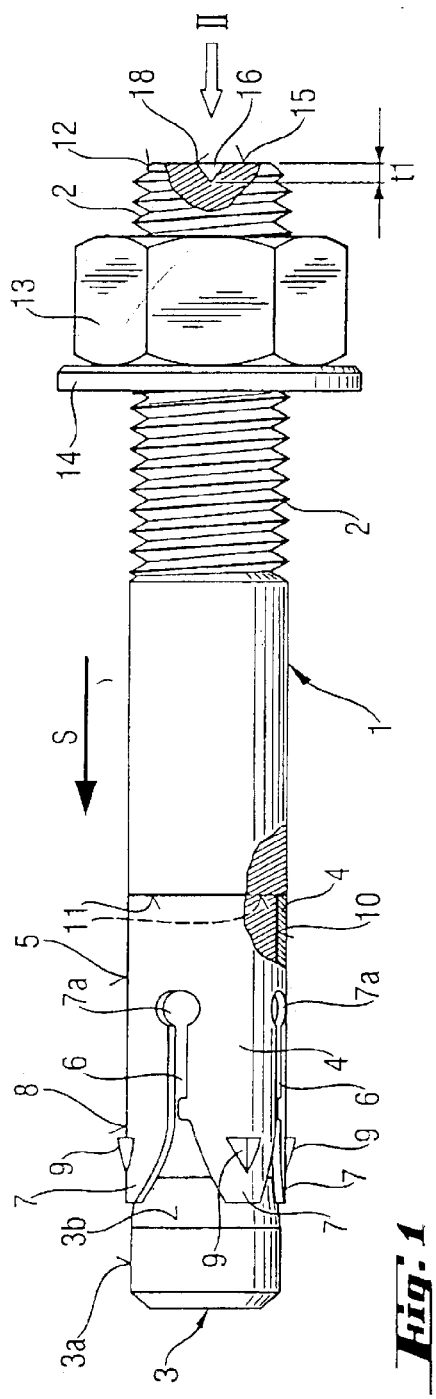
FIG. 1 is an axially extending side view of a dowel bolt according to the invention.
Figure 2:
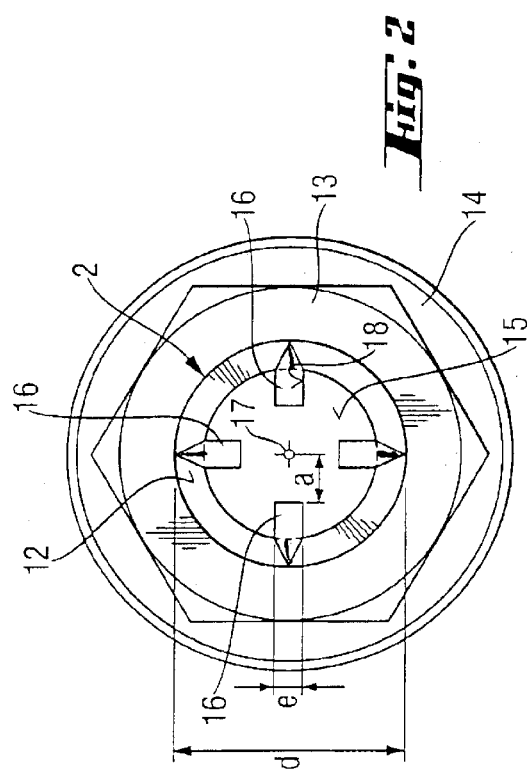
FIG. 2 is an enlarged illustration of a plan view of the trailing end face of the dowel bolt shown in FIG. 1 opposite the setting direction, as viewed in direction II in FIG. 1.

FIGS. 1 and 2 represent a dowel bolt according to the invention comprised of an axially extending bolt 1 with an outer thread 2 at its trailing end at the opposite end from an expansion head 3 at the leading end, expanding in the setting direction S. An expansion sleeve 4 mounted on an axially extending leading end section of the bolt can be expanded by the expansion head 3, and the dowel bolt has a nut 13 that can be threaded onto the external thread 2. Conventionally the nut 13 will abut, in the setting direction, a washer 14.

The expansion head 3 has an essentially cylindrical expanding section 3a followed opposite to the setting direction by a conical expansion section 36 connects, expanding in the setting direction S, at the end of the expanding section 3a facing away from the setting direction.

The expansion sleeve 4 has axially extending elongated slots 6 distributed in the circumferential direction over its periphery 5, the slots 6 being open in the setting direction S and in the setting end zone of the expansion sleeve 4 further divide into four expansion tabs 7. The end zone of the expansion tabs 7 leading in the setting direction each extend partially into the radial projection of the conical expansion section 3b. Each expansion tab 7 further has an outwardly projecting burr 9 arranged on the outer surface 8 of the expansion sleeve 4 approximately centrally relative to the elongated slots 6.

For accommodating the inner surface of the expansion sleeve 4, the bolt 1 has in the axially extending region of the expansion sleeve 4 a reduced diameter section 10, wherein its depth corresponds approximately to the wall thickness of the expansion sleeve. The annular shaped surface 11 of the bolt facing in the setting direction forms a stop for the expansion sleeve 4.

The trailing end face 15 of the bolt 1 has four recesses 16 of a depth t1 corresponding to 0.025 times the diameter d of the bolt and uniformly spaced around the circumference of the trailing end face 15 facing opposite to the setting direction. The recesses 16, which are configured triangularly in the radially outer direction, are open to the circumferentially extending external surface 12 of the bolt 1, for example towards outer thread 2, and on the trailing end face 15 an inner essentially rectangular opening 18. Two corresponding recesses 16 are arranged diametrically opposite each other. The radially inner end of the recesses have a spacing a from the central axis 17 of the bolt 1, the space a corresponding to 0.3 times the diameter of the bolt. Further, the maximum width e of the recesses 16, extending in the circumferential direction of the bolt 1, corresponds to 0.025 times the diameter d of the bolt.

What is claimed is:

1. A dowel bolt comprises an axially extending bolt (1) having a leading end facing in a setting direction (S) and a trailing end facing opposite to the setting direction, an outer thread (2) extending from the trailing end in the setting direction (S), an expansion head (3) on said bolt at the leading end and extending toward the trailing end, said expansion head (3) having an axially extending expansion section (3a) expanding in the setting direction (S), an axially extending expansion sleeve (4) encircling said expansion head (3) and expansion section (3a), said trailing end of said bolt (1) having a trailing end face (15) extending transversely of the setting direction (S) and having at least one recess (16) therein extending inwardly in the setting direction and having a depth (t1) in the setting direction, said recess (16) has a radially outer approximately triangular cross section part extending transversely of the setting direction (S), said recess radially inwardly of said triangular cross section part has a rectangular shaped part (18) extending axially in the setting direction (S) from said tailing end face (15) and said recess (16, 18) is open at the trailing end face (15) and at a circumferentially extending external periphery of said bolt (1) adjacent said trailing end face (15).

2. A dowel bolt, as set forth in claim 1, wherein two correspondingly shaped recesses (16,18) are positioned diametrically opposite to one another in said trailing end face (15).

3. A dowel bolt, as set forth in claim 1, wherein said recess (16) has a radially inner end spaced at least a distance (a) from a central axis (17) of said bolt (1), and said distance (a) is in a range of 0.15 to 0.35 a maximum diameter (d) of said bolt (1).

4. A dowel bolt, as set forth in claim 3, wherein the depth (t1) of said recess (16) is in the range of 0.03 to 0.08 times the diameter (d) of said bolt (1).

5. A dowel bolt, as set forth in claim 1, wherein a maximum width of said recess (16) extending in the circumferential direction of said bolt (1) is in the range of 0.05 to 0.2 times the diameter (d) of said bolt (1).

6. A dowel bolt, as set forth in claim 1, wherein four recesses (16,18) are formed in said trailing end face (15) in equidistant spaced relation around the circumference of said trailing end face (15).

* * * * *